July 19, 1966   HANNS-DIETER PASCHKE   3,261,334
LUBRICATING SEALING STRUCTURE FOR ROTARY MECHANISMS
Filed Dec. 5, 1963   3 Sheets-Sheet 3

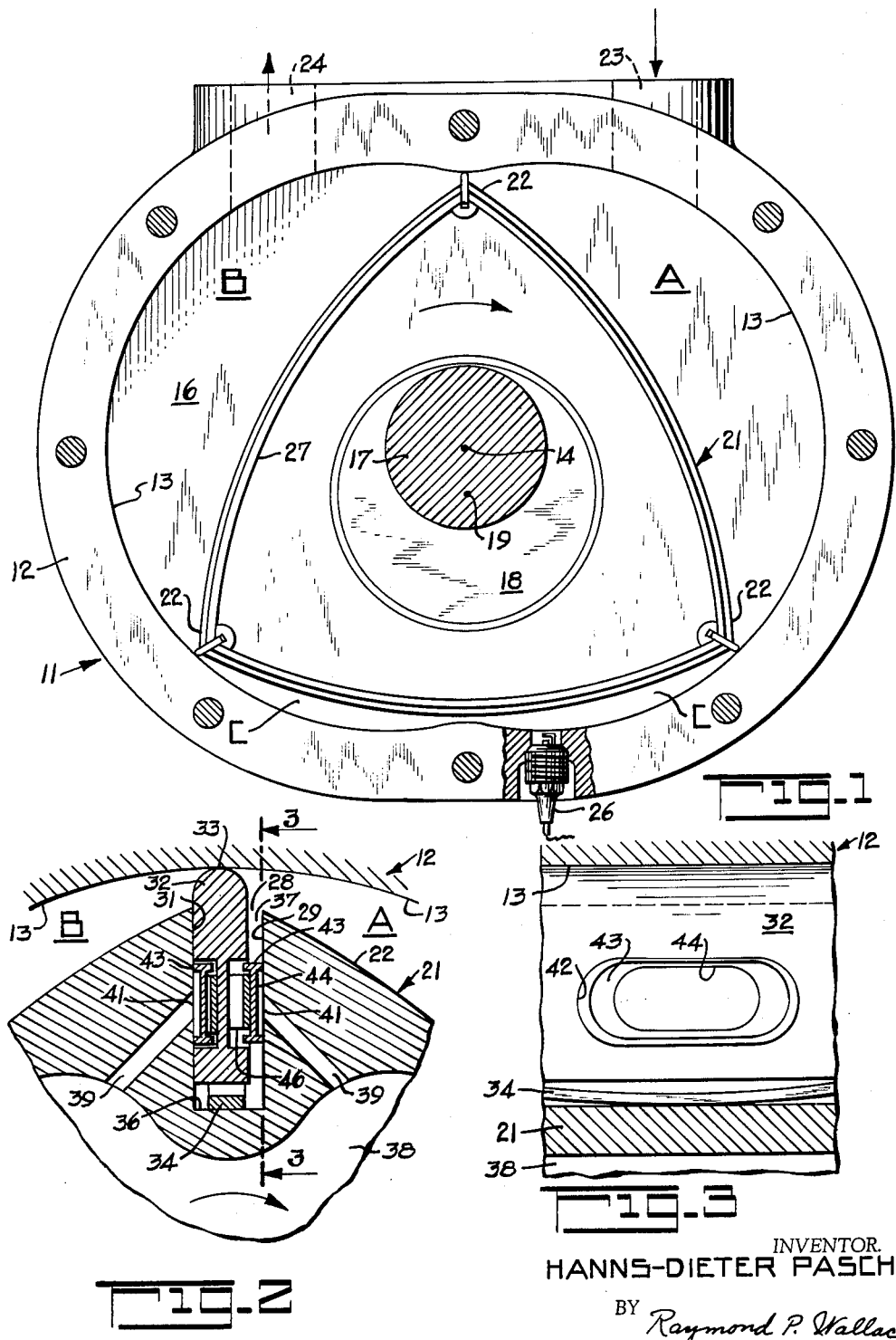

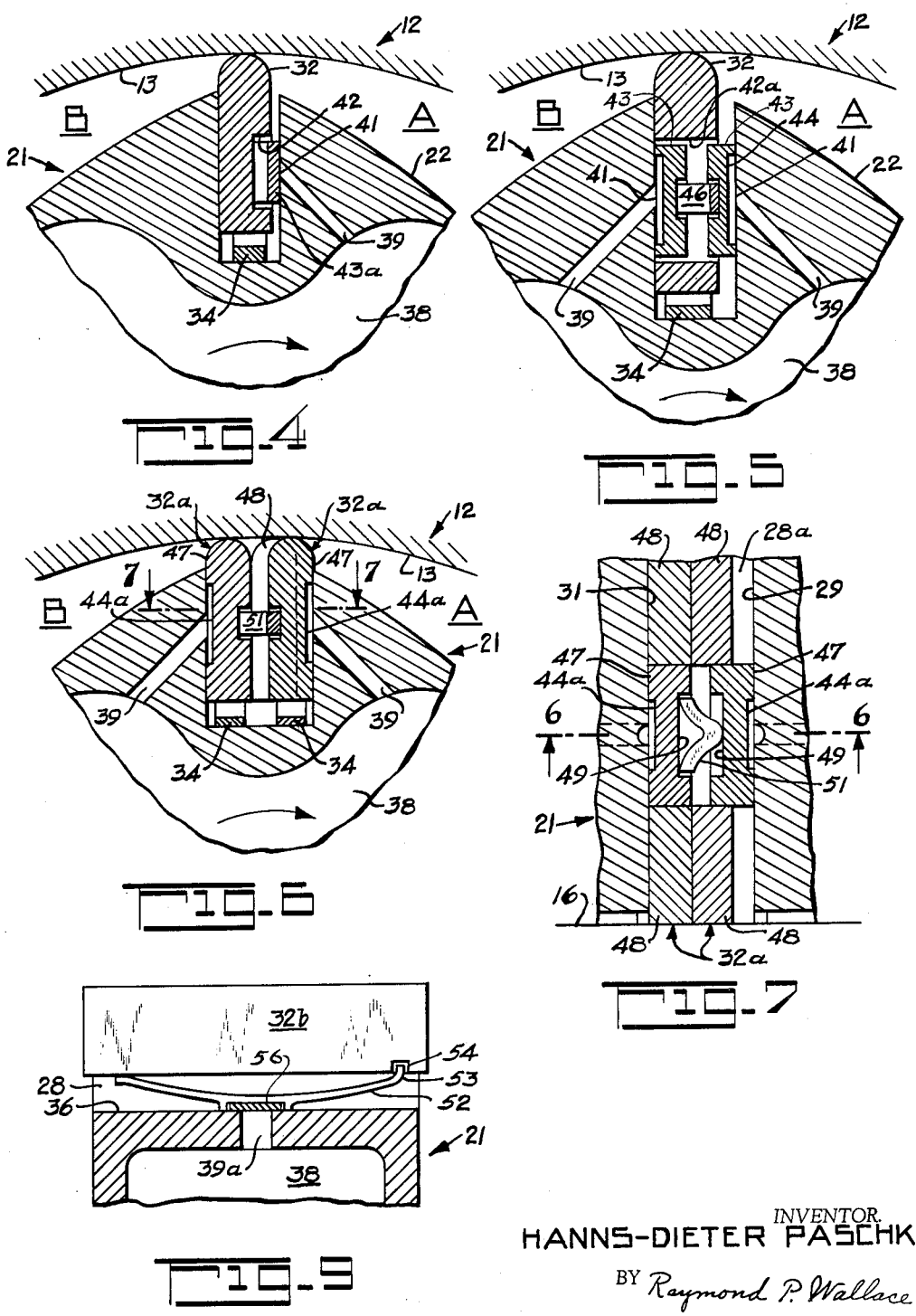

INVENTOR.
HANNS-DIETER PASCHKE
BY Raymond P. Wallace
AGENT

United States Patent Office 3,261,334
Patented July 19, 1966

3,261,334
LUBRICATING SEALING STRUCTURE
FOR ROTARY MECHANISMS
Hanns-Dieter Paschke, Neckarsulm, Wurttemberg, Germany, assignor to NSU Motorenwerke Aktiengesellschaft, Neckarsulm, Germany, and Wankel G.m.b.H., Lindau (Bodensee), Germany, both corporations
Filed Dec. 5, 1963, Ser. No. 328,420
Claims priority, application Germany, Dec. 11, 1962,
N 22,466
9 Claims. (Cl. 123—8)

This invention relates to a novel sealing structure and means of lubricating the same in rotary piston machines, particularly internal combustion engines of the Wankel type.

Such engines are known in the art as comprising an outer body having a peripheral housing having a multi-lobed inner surface of basically epitrochoidal profile when viewed in a direction parallel to the axis, the peripherial housing being closed by an end plate at each end to form a cavity therein. Disposed within the cavity is a multi-apexed inner body having one more apex than the number of lobes of the outer body, the inner body having an axis displaced from but parallel to the axis of the outer body. The inner and outer bodies are relatively rotatable with respect to each other, the apexes of the inner body sweeping the epitrochoidal inner surface of the outer body. For convenience the inner body will generally be referred to hereinafter as the rotor, although it is to be understood that in such engines only the outer body may rotate, or both inner and outer bodies may be rotatable.

In order for the rotor apexes to maintain sealing contact with the epitrochoidal inner surface, each apex is provided with a longitudinally extending groove having its depth in the generally radial direction, in which is positioned a radially movable sealing means which sweeps the inner surface in contact therewith. Such sealing means may be a single strip extending between the end plates, or may be a plurality of such strips positioned in each groove. For such a sealing means to be radially movable, there must of necessity be clearance between the walls of the groove and the seal strip or strips, and for perfect sealing to be maintained the seal strip must be pressed against one or the other of the side walls of the groove during operation. In order to attain radial freedom of motion of the strip while it is in tight contact with one or the other of the groove walls, it is necessary that lubrication be provided.

It is already known in the prior art to provide lubrication of such seals by adding oil to the fuel, as is common with two-cycle combustion engines, or to convey oil to the bottom of the grooves from a supply through the central portion of the rotor. However, neither method allows metering a suitable amount of oil to the seals, the first method is very wasteful of lubricant, and the second method provides no means to keep gas under pressure from entering the groove and back-pressuring the oil outlet so that no lubricant flows. The present invention overcomes these defects of the prior art by providing self-metering means in combination with the seals and their respective grooves, and blocks the oil orifices in the grooves against back-pressuring by operating gases.

It is therefore a primary object of this invention to provide an improved means of lubricating seal strips.

It is a further object to provide a means of metering oil to seal strips.

Another object is to provide means for supplying metered quantities of lubricant to both sides of such a seal strip.

Still another object is to maintain an uninterrupted supply of oil to the seal strips.

Other objects and advantages of the invention will become apparent on reading the following specification in connection with the accompanying drawings, in which FIG. 1 shows an end view of a Wankel type engine in the axial direction, with one end plate removed;

FIG. 2 is a much enlarged fragmentary cross-sectional view of one apex of a rotor showing one embodiment of the invention;

FIG. 3 is a fragmentary view taken along line 3—3 of FIG. 2;

FIG. 4 is a view similar to FIG. 2, showing another embodiment;

FIG. 5 is a similar view showing a third embodiment;

FIG. 6 is a similar view showing a fourth embodiment;

FIG. 7 is a view taken on line 7—7 of FIG. 6;

FIG. 9 is a fragmentary view showing still another embodiment.

Figure 8:
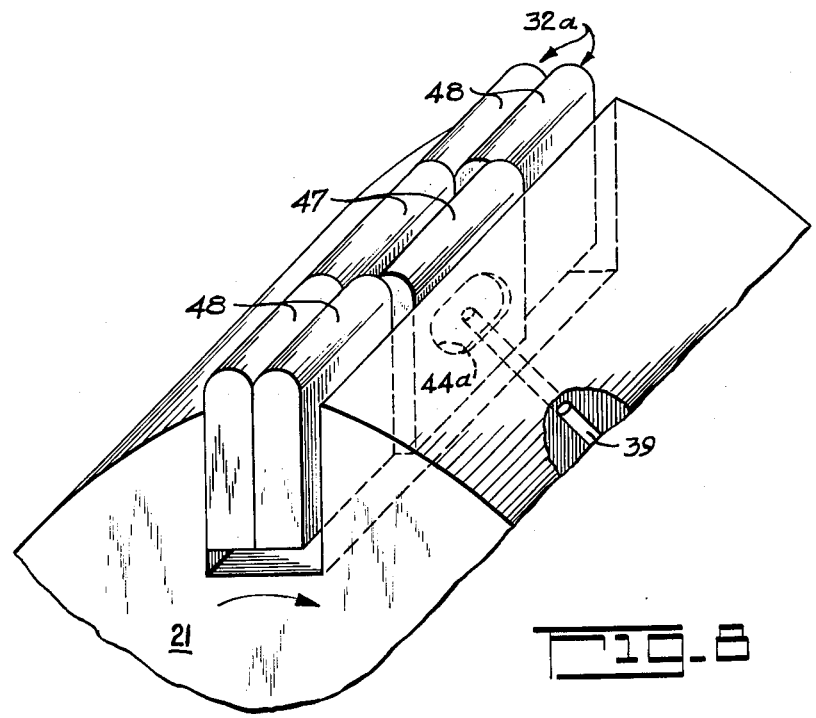
FIG. 8 is a semi-schematic perspective view of the embodiment of FIGS. 6 and 7.

In FIG. 1 there is shown a Wankel type engine 11 in one of its simpler forms, that of an outer body having a two-lobed epitrochoidal peripheral housing and a three-apexed inner body, in which the outer body is stationary and the inner body rotatable. The present invention, however, is applicable to any form of such engines.

There is shown an outer peripheral housing 12 having an inner surface 13 of basically epitrochoidal outline and a central longitudinal axis 14. The peripheral housing is closed at each end by an end plate 16, of which only the rearmost is shown. A shaft 17 is positioned on axis 14, transpiercing the end plates 16, and having an eccentric portion 18 disposed within the outer body cavity and having an axis 19 displaced from axis 14 but parallel thereto. A rotor or inner body 21 is rotatably mounted on the eccentric and is rotatable with respect to the outer body in the direction shown by the arrow, having a plurality of apex portions 22 each bearing sealing means in accordance with the invention in constant sweeping and sealing relation with the epitrochoidal inner surface 13. The outer body is provided with an intake port 23 and an exhaust port 24, and ignition means 26. Gas seals 27 are provided at each end of the rotor, in contact with the end plates 16. As the rotor rotates within the cavity of the outer body, there are formed variable-volume working chambers A, B, and C, which chambers each successively perform the functions of intake, compression, expansion, and exhaust of a four-cycle internal combustion engine. The chambers A, B, and C are sealed against the escape or leakage of gas by the end-face seals 27 and the apex sealing means of the invention, now to be described.

In FIG. 2 there is shown in cross-section a portion of housing 12 with its epitrochoidal inner surface 13, and one apex 22 of the rotor 21, with leading chamber A undergoing compression at a gas pressure higher than that prevailing in trailing chamber B, which is intaking. The apex of the rotor is provided with a groove 28 having suitable depth in the generally radially inward direction, and traversing the rotor longitudinally from one end to the other. The leading wall of the groove is designated 29, and the trailing wall 31.

Positioned in the groove 28 is a seal strip 32, the crest 33 of which slides continuously along the inner surface 13 in sealing relation therewith, being maintained in contact by suitable resilient means, such as the leaf spring 34 bearing against the radially inward edge of the seal strip and the bottom 36 of groove 28. Thus the seal strip may make small radial motions without losing sealing contact with the inner surface of the peripheral housing. The thickness of the seal strip and the width of the groove between the leading wall 29 and the trailing wall 31 are so proportioned that there is suitable clearance between the two members for easy motion, and also to allow gas from the higher pressure chamber to get under the seal, which aids in maintaining its radially outward thrust. Such clearance 37 is shown in FIG. 2 as being wholly on the leading side of the seal strip, since the high pressure in chamber A holds the strip against the trailing wall of the groove. It will be understood that the seal strips move back and forth from the leading wall to the trailing wall of their respective grooves, depending on which chamber has the higher pressure at any given portion of the cycle, but since the strip will always be in contact with one wall or the other, except during the substantially instantaneous traversal, perfect sealing is maintained. For clarity of illustration, the proportions of the groove and seal elements to the rotor are much exaggerated in FIG. 2 and similar figures.

The rotor 21 is provided with at least one internal cavity 38 which is supplied with lubricating fluid through any appropriate means (not shown). Passages 39 communicating with cavity 38 run in a generally outward direction therefrom and have orifices 41 opening in each wall of the groove, for delivery of lubricating fluid thereto. Flow of fluid may be maintained by pressure in cavity 38 provided by external means (not shown), or preferably by centrifugal action of the rotor. Orifices 41 are disposed approximately midway of both the longitudinal and the radial extent of each groove wall.

Seal strips 32 are provided with a recess 42 in each leading and trailing side, of any suitable depth. In each such recess 42 is disposed a dam 43, comprising a small plate-like element having an oil-receiving recess 44 in the side exposed to the groove wall, and a spring-retaining recess in the opposite side. A thin leaf spring 46 disposed in the spring-retaining recess bears against the dam and the bottom of seal recess 42, holding the dam always in contact with its adjacent groove wall, whatever the orientation of the seal strip at any portion of the cycle.

The position and dimensions of seal recesses 42, dams 43, and oil-receiving recesses 44 are so selected that the orifices 41 of the oil passages 39 discharge into recesses 44, but are at no time uncovered by the rim of the dam during movements of the seal strips and dams so as to permit free flow into grooves 28. Recesses 42 may be of any convenient outline, but should preferably have a shape which is self-centering with the dams, which have a similar outline, during relative motion between the seals and the dams; such self-centering shapes are circular, elliptical, or some approximation of either form, as shown. Ample clearance is provided between the periphery of the dams and the peripheral edges of recesses 42, so that as the seal strips perform their minute radial or longitudinal motions within the rotor grooves, the dams oscillate back and forth within the seal recesses and spread a film of oil over the groove walls from the oil-receiving recesses 44. Recesses 44 and orifices 41 are so dimensioned and positioned that with the utmost radially outward movement the dams may make, there is always a portion of recesses 44 radially inward from the orifices, to provide minute reservoirs of oil for any portion of the cycle during which there may be no flow through passages 39, and during such time as centrifugal force at a given rotor apex is directed radially inward the reservoirs cannot be emptied back into the passages.

With the structure described, it will be seen that the dams prevent an uncontrolled flow of oil into the rotor grooves, and at the same time prevent operating gases from back-pressuring the supply of oil through passages 39. Simultaneously, the dams provide and distribute a metered supply of oil to the walls of the grooves, from which it is transferred to the sides of the seal strips, whence a sufficient amount finally reaches the seal apexes which sweep the inner surface of the epitrochoidal housing.

As shown in FIG. 4 there is only one oil supply passage 39 and one dam 43a movably positioned in a single recess 42 on one side of a seal strip 32, although the embodiment may equally be constructed with a plurality of each. In this case the dam 43a is itself a leaf spring, and is not provided with any oil-receiving recess. Nevertheless, it occludes the orifice 41 at all times, distributing a film of oil therefrom, preventing uncontrolled flow, and blocking the orifice against back-pressure.

The embodiment of FIG. 5 is very similar to that of FIG. 2, except that in the present case a single seal recess 42a is provided as an aperture entirely through the seal strip 32, the single aperture containing both dams 43 with ample operating clearance within the confines of the aperture. The dams are provided as before with oil-receiving recesses 44 in the sides facing the groove walls, and spring-retaining recesses on their inner sides. A single leaf spring 46 is disposed between the two dams, urging both against their respective facing groove walls. In all other respects the construction and operation of this embodiment are precisely the same as that shown in FIG. 3.

In FIGS. 6, 7, and 8 there is shown a further embodiment of the invention, operating in the same manner as the embodiments of FIGS. 2 and 5, but with some differences in structure. In this embodiment two multipart seal strips are disposed in each rotor apex groove, each seal strip comprising a middle part flanked by two end parts, with the middle parts performing apex sealing against the epitrochoidal surface as well as the damming function.

As shown in the drawings, a rotor apex groove 28a, wider than the grooves of previously described embodiments, contains two seal strips 32a side by side in parallel relation, with suitable clearance between the groove walls and the seal strips. Each composite strip 32a comprises a middle part 47, which acts as a dam, and two end parts 48, the three parts of each strip being disposed in end-to-end relation within the groove and the sum of their lengths being sufficient to extend from one end wall 16 to the other end wall of the engine. Disposed in the groove 28a is a leaf spring 34 under each strip, which springs urge their respective multipart strips resiliently radially outward into sealing contact with the epitrochoidal surface, each of the composite seal strips having the outer edges of all its parts contoured suitably for sweeping the inner surface of the housing.

Each of the middle parts 47 is provided with an oil-receiving recess 44a in the side facing the groove wall, the recesses being positioned at a location adjacent to the orifice 41 in the respective groove wall and receiving oil therefrom. As in the embodiment of FIG. 3, the recesses 44a are so dimensioned and positioned that there is always a reservoir of oil therein below the orifices, and during radial movements of the middle parts or dams 47 the orifices will always discharge into the recesses, but will never be open to the groove.

Each of the middle parts is provided with a spring-retaining recess 49 in its inner side, and a resilient member such as spring 51 is disposed therein, bearing against the two dams and holding them apart, each dam in contact with its respective groove wall and occluding the orifices against unrestricted flow and against back-pressure. The radial movements of the dams distribute oil on the groove walls, as described above.

The two end parts 48 of each seal strip 32a, however, may move freely in response to gas pressure back and forth in the groove in the circumferential direction. Thus when the pressure is higher in chamber A, as shown, the entire trailing multipart seal strip 32a will be pressed against trailing groove wall 31, the two end parts of the leading seal strip will be pressed against the other strip, leaving groove wall 29 free. When the pressure in chamber B is higher, the seal strip parts which are freely movable will traverse the width of the groove toward the leading wall. It will be seen that according to pressure conditions all the parts of either the leading or the trailing strip 32a will be in line, and it is this strip which performs the major portion of the sealing against the epitrochoidal inner surface. As in previous embodiments, gas pressure will enter the rotor groove through the clearance provided, assisting in maintaining the position of the seal strips in the radially outward direction, and in holding the two dam parts against the groove walls.

FIG. 9 shows a still further embodiment applying the principles of the invention. In this case the rotor is provided at each apex with a single oil supply passage 39a from cavity 38, having its orifice in the bottom 36 of the groove 28. A single seal strip 32b is positioned within the groove, radially movable and urged resiliently outward by a spring member 52 bearing against the bottom of the groove. The spring 52 has one end 53 anchored in a transverse notch 54 in the radially inner edge of the seal strip, having the result that during flexure of the spring its support point at the center of curvature shifts back and forth along the groove bottom 36. The spring itself may serve as the dam, distributing the oil by its reciprocating movement, or in order to secure a better sealing action against the orifice, the bottom of the spring may be provided with a recess in which is positioned a loosely fitting small flat plate 56 which acts as the dam.

It is to be understood that the invention is not limited to the specific embodiments shown and described, but that various modifications may be made by those skilled in the art without departing from the scope of the invention. It is intended to cover all such modifications in the appended claims.

What is claimed is:

1. A rotary-piston internal combustion engine, comprising in combination an outer body having a pair of end plates interconnected by a peripheral wall to form a cavity therein having a longitudinal axis, a multi-apexed inner body disposed within said outer body for rotation relative thereto, said inner body being rotatable about an axis displaced from said outer body axis but parallel thereto to form between said inner and outer bodies a plurality of working chambers which vary in volume upon relative rotation between said inner and outer bodies, each apex of said inner body having a longitudinally extending groove, each of said grooves having disposed therein at least one longitudinally extending seal strip sweeping the inner surface of said peripheral wall in sealing relation thereto and capable of reciprocal radial motion, said inner body having an internal lubricant cavity and lubricant passage means from said lubricant cavity having an orifice in at least one wall of each of said grooves for delivery of lubricant thereto, and a dam element separate from its associated seal strip and covering each of said orifices and movable with said seal for distribution of lubricant from its associated orifice and occluding said orifice against free lubricant flow therethrough and against back-pressure from said working chambers, regardless of the associated seal strip orientation.

2. The combination recited in claim 1, wherein said orifice is disposed in a side wall of said groove, each of said seal strips has a recess in at least one side thereof, and said dam element is disposed in said recess and is resiliently urged against said orifice.

3. The combination recited in claim 2, in which said dam element is resiliently urged by a leaf spring.

4. The combination recited in claim 2, in which said dam element is an integral part of a leaf spring.

5. The combination recited in claim 1, in which both the leading wall and the trailing wall of each groove have one of said orifices therein, each of said seal strips has an aperture therethrough adjacent said orifices, and each of said apertures has disposed therein a pair of said dam elements, with resilient means disposed between said dam elements.

6. The combination recited in claim 5, in which each dam element has a reservoir recess in the side thereof occluding said orifice.

7. The combination recited in claim 1, wherein each of said grooves has an orifice in each side wall thereof and a pair of seal strips disposed therein, each of said seal strips comprising a middle part and flanking end parts, said middle parts being said dam elements and having resilient means disposed therebetween and occluding said orifices.

8. The combination recited in claim 1, wherein said orifice is disposed in the bottom wall of said groove, and a leaf spring is disposed between said bottom wall and said seal strip for urging said seal strip resiliently radially outward, said leaf spring occluding said orifice and having one end anchored against longitudinal movement in said groove to provide reciprocal movement and lubricant distribution by said dam at its occluding portion upon compression of said spring.

9. The combination recited in claim 8, wherein said leaf spring is provided with a recess in the side facing said bottom groove wall, and a dam member is disposed in said recess occluding said orifice.

References Cited by the Examiner
UNITED STATES PATENTS

| | | | |
|---|---|---|---|
| 2,834,322 | 5/1958 | Mallinckrodt. | |
| 3,142,440 | 7/1964 | Schagg | 230—145 |
| 3,206,108 | 9/1965 | Abermeth | 123—8 X |

SAMUEL LEVINE, *Primary Examiner.*

F. T. SADLER, *Assistant Examiner.*